United States Patent [19]

Marinus

[11] Patent Number: 5,412,556
[45] Date of Patent: May 2, 1995

[54] SWITCHED MODE POWER SUPPLY CIRCUIT INCLUDING A CONTROL CIRCUIT HAVING TWO MODES OF OPERATION EACH MODE SELECTED IN DEPENDENCE ON THE POWER TO BE SUPPLIED AT THE OUTPUT

[75] Inventor: Antonius A. M. Marinus, Eindhoven, Netherlands

[73] Assignee: U.S. Philips Corporation, New York, N.Y.

[21] Appl. No.: 174,089

[22] Filed: Dec. 28, 1993

[30] Foreign Application Priority Data

Dec. 30, 1992 [NL] Netherlands ............... 9202295

[51] Int. Cl.⁶ .................................. H02M 3/335
[52] U.S. Cl. ............................. 363/21; 363/56; 363/97; 363/131
[58] Field of Search ............ 363/21, 56, 97, 131, 363/20, 55, 95

[56] References Cited

U.S. PATENT DOCUMENTS 4,885,673  12/1989  Philippe ........................ 363/21
5,130,561  7/1992  Elliott et al. ................... 363/56 X
5,218,521  6/1993  Augier .......................... 363/56

FOREIGN PATENT DOCUMENTS 0380033  8/1990  European Pat. Off. .
0420997  4/1991  European Pat. Off. .

Primary Examiner—A. D. Pellinen
Assistant Examiner—Y. J. Han
Attorney, Agent, or Firm—Edward Blocker

[57] ABSTRACT

In switched-mode power supply circuits the switch is rendered conducting for a longer period (or more frequently), dependent on the load connected to the power supply circuit, so as to ensure that the transformer can transfer enough energy to the secondary side for charging the output capacitor to a sufficient extent. To ensure that the transformer can always supply all energy stored in the transformer to the secondary side, a demagnetizing detection circuit detects the demagnetization of the transformer. If the load decreases (for example, in standby operation) the on-time of the switch is reduced. However, this on-time may achieve a minimum value so that the power supply circuit no longer functions properly. To obtain an efficiently operating power supply circuit, both in normal operation and in a low-load state, the control circuit of the power supply circuit has at least two modes, i.e. a first mode (standby operation) in which the control pulses are applied to the switch at a fixed frequency and the demagnetizing signal has no influence, and a second mode (normal operation) at a variable frequency, in which second mode the frequency of the control pulses is variable and, if necessary, the demagnetizing signal can delay the control pulses applied to the switch when the transformer is not fully demagnetized.

9 Claims, 3 Drawing Sheets

SWITCHED MODE POWER SUPPLY CIRCUIT INCLUDING A CONTROL CIRCUIT HAVING TWO MODES OF OPERATION EACH MODE SELECTED IN DEPENDENCE ON THE POWER TO BE SUPPLIED AT THE OUTPUT

FIELD OF THE INVENTION

The invention relates to a switched-mode power supply circuit having input terminals for receiving an input voltage and output terminals for supplying an output voltage. A series arrangement of a primary winding of a transformer and a switch are coupled parallel to the input terminals of the power supply circuit. A secondary winding of the transformer is coupled to the output terminals of the power supply circuit, and a control circuit has an input coupled to the output terminals of the power supply circuit and an output for applying a control signal to the switch.

The invention also relates to a control circuit for use in such a power supply circuit.

BACKGROUND OF THE INVENTION

A power supply circuit of this type is known from European Patent Application EP-A 380033. This known power supply circuit has a pulse width modulation control in which the control circuit receives two input signals, i.e. a first input signal for determining the starting moment of a new pulse and a second input signal for receiving a signal related to the output voltage.

This known power supply circuit has the drawback that it does not operate efficiently, while the transformer may become saturated.

SUMMARY OF THE INVENTION

It is an object of the invention to eliminate the above-mentioned drawbacks. To this end a power supply circuit including a switch coupled in series to a primary winding of a switch is characterized in that the control circuit is adapted to receive a feedback signal which is dependent on the power to be supplied by the power supply circuit at the output terminals. The control circuit is further adapted to receive a demagnetizing signal at a further input. The control circuit having, in operation, a first mode with a a predetermined fixed frequency, in which mode the feedback signal determines the duration of the pulses, and a second mode in which the control circuit controls the switch by means of a control signal. The frequency of the pulses of the control signal is dependent on the feedback signal and the control signal is delayed by means of a delay circuit which is dependent on under the influence of the demagnetizing signal.

It is thereby achieved that the power supply circuit optimally functions in normal operation as well as in standby operation. For normal operation it is of great importance that the transformer is fully demagnetized before the switch is rendered conducting again, otherwise the transformer becomes saturated causing incorrect operation which results in the energy no longer being transported to the secondary side. In standby operation the demagnetizing signal is not important, because the transformer will not become saturated. However, in standby operation it should be ensured that the switch is conducting during the minimum on-time. Since the load in standby operation is much smaller than in normal operation, the switch should be conducting for a much shorter time. To prevent the minimum on-time from being reached, the frequency of the control pulses of the switch in standby operation is set at a fixed value (generally a lower frequency).

It is to be noted that a power supply circuit is known from European Patent Application EP-A 420997 in which the control circuit receives a demagnetizing signal at an input. However, in this power supply circuit there is no switching in any way between normal operation and standby operation. An embodiment of a power supply circuit is characterized in that the control circuit operates in the first mode at a feedback signal which is smaller than a predetermined value and in the second mode at a feedback signal which is larger than a predetermined value.

BRIEF DESCRIPTION OF THE DRAWINGS

These and other aspects of the invention will be apparent from and elucidated with reference to the embodiments described hereinafter.

In the drawings.

DETAILED DESCRIPTION OF THE DRAWINGS

Figure 1:
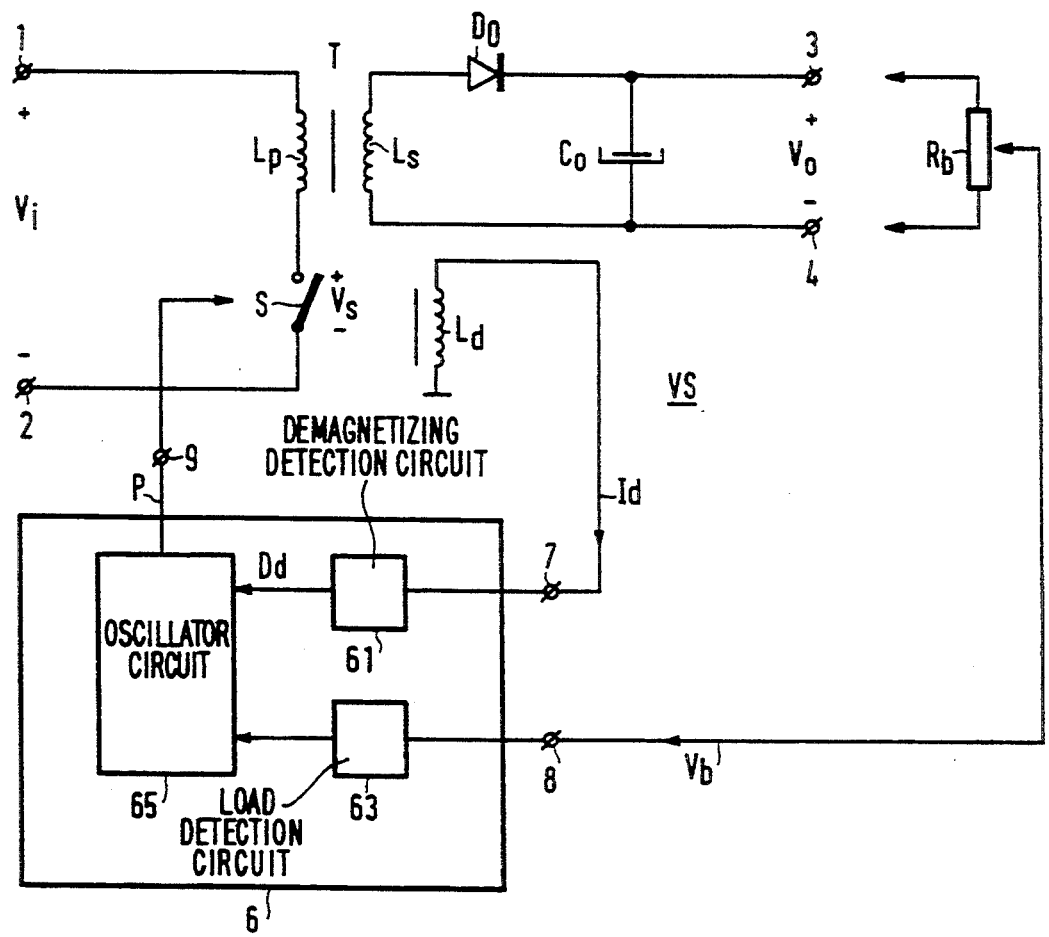
FIG. 1 shows a first embodiment of a switched-mode power supply circuit according to the invention.

FIG. 1 shows an embodiment of a switched-mode power supply circuit VS with input terminals 1 and 2 at which an input voltage Vi is supplied (for example, from a rectifier connected to the mains). A series arrangement of a primary winding Lp of a transformer T and a switch S is connected across the input terminals 1, 2. The switch S may be, for example a bipolar high-voltage transistor or a MOS field effect transistor. A series arrangement of a diode Do and a storage capacitor Co is connected across a secondary winding Ls of the transformer. Output terminals 3 and 4 of the power supply circuit are connected across the storage capacitor Co for supplying an output voltage Vo. A load Rb may be connected across the output terminals 3, 4. The switch S is rendered conducting and non-conducting by means of control pulses P from an output 9 of a control circuit 6, the on-time (period of conductance) of the switch being determined, inter alia by the load connected to the power supply circuit. An input 8 of the control circuit receives a feedback signal Vb which is a measure of the power to be supplied by the power supply circuit to the load. A second input 7 of the control circuit 6 receives a signal Id indicating whether the transformer T is fully demagnetized. The second input 7 is connected to an extra winding Ld on the transformer for detecting whether the transformer is demagnetized or not demagnetized. The control circuit 6 comprises a load detection circuit 63 which is coupled to the input 8 for receiving the feedback signal Vb. The control circuit further comprises a demagnetizing detection circuit 61 coupled to the input 7 for receiving the signal Id. With reference to this signal, the demagnetizing detection circuit determines whether the transformer is fully or not fully demagnetized. It is of great importance that the transformer is fully demagnetized before the switch S becomes conducting again. If the switch is rendered conducting before the transformer is fully demagnetized, the transformer will be fully saturated after some time and no longer operate as a transformer so that the power supply circuit can no longer supply the required output voltage. Moreover, the power supply circuit will use (dissipate) much more energy when the transformer becomes saturated or operates proximate to its range of saturation, as compared with the situation in which the transformer does not operate in its range of saturation.

The control circuit further comprises an oscillator circuit 65 for generating and supplying a control signal to the switch. This oscillator circuit comprises switching means which switches the oscillator operation between two different modes. In a first mode the oscillator frequency is variable and the frequency is controlled in dependence upon the load Rb. However, to prevent the transformer from becoming saturated, the oscillator circuit 65 receives a demag-signal Dd from the demagnetizing detection circuit 61, which demag-signal in this mode prevents the oscillator circuit from supplying a subsequent control pulse to the switch before the transformer T is fully demagnetized. In this first mode the oscillator circuit 65 operates as long as the load of the power supply circuit is high enough, i.e. during normal operation.

If the load falls below a predetermined value, the oscillator circuit switches over to a second mode, in which second mode the oscillator supplies control pulses at a fixed frequency and at which the demag-signal Dd is no longer considered. At a low load the transformer can never become saturated and the demag-signal thus need not be considered.

By causing the control circuit to operate in two different modes, dependent on the load, a power supply circuit is obtained which operates efficiently in both modes and thus has a minimum dissipation.

Figures 2A, 2B:
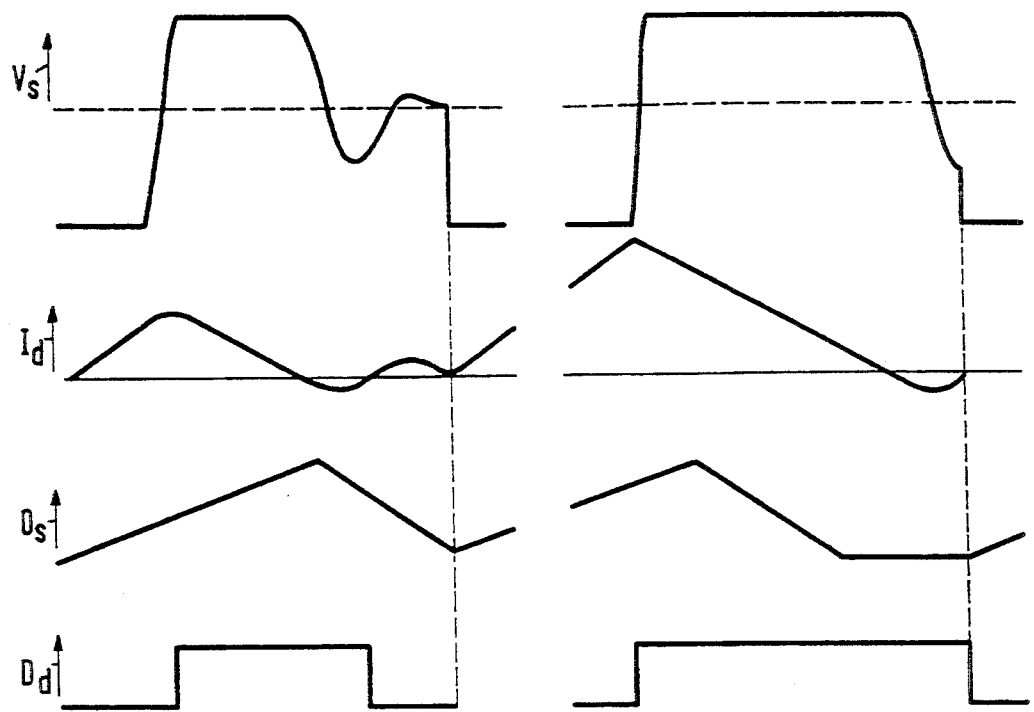
FIGS. 2a and 2b show voltage-time diagrams for the different signals.

FIG. 2 shows voltage-time diagrams for the two modes. FIG. 2A shows the voltages for a low load and FIG. 2B shows the same voltages for a high load.

FIG. 2A shows, one below the other, the voltage Vs across the switch S, the demagnetizing signal Id, the oscillator sawtooth Os from which the control pulses P are derived and the demag-signal Dd. As described above, the oscillator circuit 65 does not consider the demag-signal Dd at a low load (for example, during standby), and in FIG. 2A the demag-signal is already low before the oscillator circuit sends the next control pulse to the switch S. The demag-signal has no influence on the starting moment of the rising edge of the oscillator sawtooth Os. FIG. 2B also shows, one below the other, the voltage Vs across the switch S, the demagnetizing signal Id, the oscillator sawtooth Os from which the control pulses P are derived and the demag-signal Dd. Here the starting point is a high load Rb and the Figure shows that the rising edge of the oscillator sawtooth (hence the next control pulse to the switch) does not start until the demag-signal Dd has become low and, consequently, the transformer is first fully demagnetized before the switch S is rendered conducting again.

Figure 3:
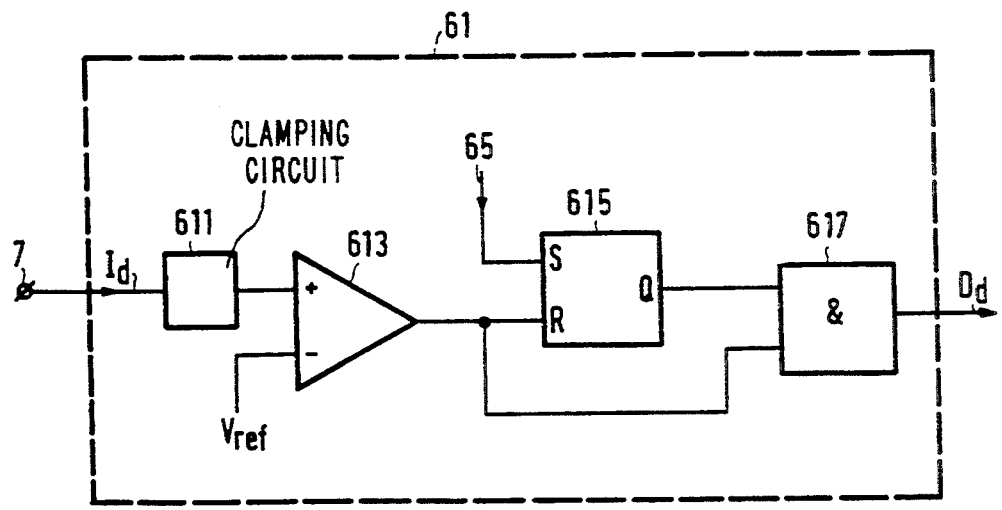
FIG. 3 shows an embodiment of a demagnetizing detection circuit for a power supply circuit according to the invention.

FIG. 3 shows the demagnetizing detection circuit 61 in greater detail. As described hereinbefore, the input of the demagnetizing detection circuit is connected to the input 7 of the control circuit, at which input the demagnetizing detection circuit receives the demagnetizing signal Id. The input 7 is connected to a clamping circuit 611 for clamping the demagnetizing signal. An output of the clamping circuit is connected to a non-inverting input of a comparator 613 which receives a reference voltage Vref of, for example 65 mV at the inverting input. The output of the comparator 613 is connected to a reset input R of a flipflop 615. The set input S of the flipflop receives a signal from the oscillator circuit (a high signal at a rising edge of the oscillator sawtooth Os (see FIG. 2) and a low signal at a falling edge of the oscillator sawtooth). As long as the demagnetizing signal Id is high, a digital high signal is present at the input R of the flipflop so that the output Q of the flipflop will be low. The output of the comparator is also connected to a first input of an AND circuit 617, and a second input of the AND circuit is connected to the output Q of the flipflop. The AND circuit supplies the demag-signal Dd (to the oscillator circuit) at the output. In this way it is ensured that the oscillator circuit cannot apply control pulses to the switch in the first mode (hence at a high load) as long as the demagnetizing signal Id is high and the transformer is consequently not fully demagnetized.

Figure 4A:
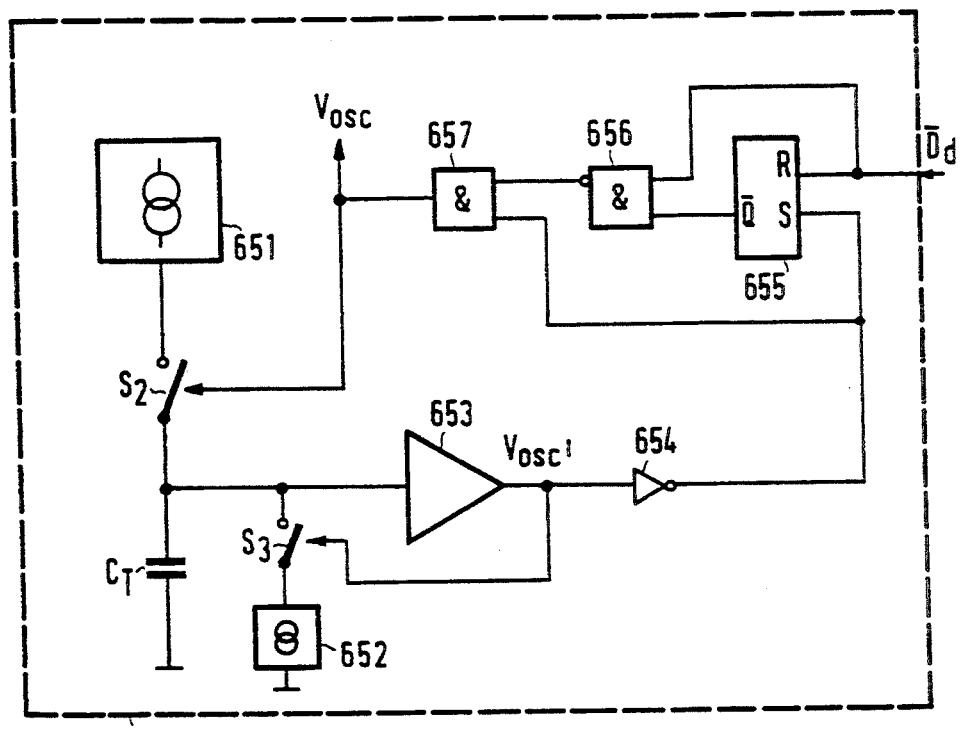
FIG. 4a shows an embodiment of a part of an oscillator circuit.
Figure 4B:
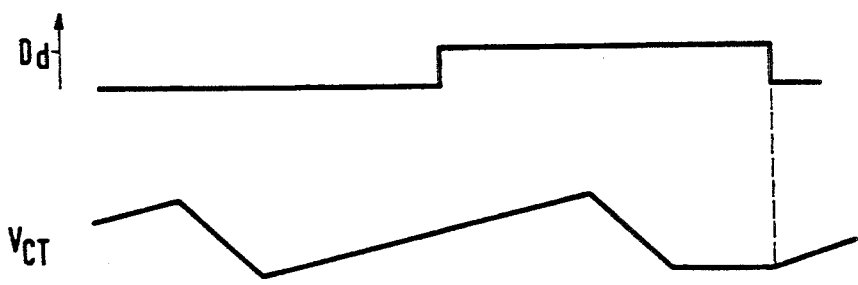
FIG. 4b shows the demag-signal and the oscillator sawtooth waveform.

FIG. 4A shows an embodiment of a part of the oscillator circuit 65 in greater detail. A current source 651 is arranged in series with a switch S2 and a capacitor Ct. the current source charges the capacitor when the switch is closed. A series circuit of a switch S3 and a current source 652 for discharging the capacitor is connected to the junction point of the switch S2 and the capacitor Ct. The junction point of the switch S2 and the capacitor Ct is also connected to an input of an operational amplifier operating as a Schmitt trigger whose output is connected to a control input of the switch S3 for opening the switch again. The output of the amplifier is also connected to a set input of a flipflop 655 via an inverter 654. A reset input of the flipflop receives the inverted demag-signal. An inverting output of the flipflop is connected to an input of a NAND circuit 656. A second input of the NAND circuit 656 receives the inverted demag-signal. The output of the NAND circuit is connected to an input of an AND circuit 657. A second input of the AND circuit is connected to the inverter 654. The output of the AND circuit 657 supplies a signal Vosc which also serves as a switching signal for the switch S2. In this way the rising edge of the oscillator sawtooth (see FIG. 4B) is delayed when the demag-signal Dd is high (and hence the inverted demag-signal is low). As described above, the demag-signal is used only during the mode in which the load is high so as to delay, if necessary, the rising edge of the oscillator sawtooth. In order to operate at a variable frequency in the second mode, without the demag-signal having any influence, the reset input of the flipflop 655 should be digitally low in this situation. This is not shown in the Figure but will be evident to those skilled in the art. FIG. 4B shows the demag-signal Dd and the oscillator sawtooth plotted against time.

It will be evident that the different elements of this power supply circuit can be implemented in all kinds of alternative ways without departing from the scope of the invention. For example, the demagnetizing detection circuit can be adapted in all kinds of analog or digital ways without its operation essentially differing from the operation described. Moreover, the oscillator circuit can be adapted in all kinds of ways, for example a fixed frequency instead of a variable frequency in the first mode.

What is claimed is:

1. A switched-mode power supply circuit, comprising:
   input terminals for receiving an input voltage;
   output terminals for supplying power to a load;
   a series arrangement of a primary winding of a transformer and a switch, coupled in parallel to the input terminals;
   a secondary winding of the transformer coupled to the output terminals;
   a control circuit having an input, and an output for supplying a control signal to the switch;
   means for generating a feedback signal, coupled to the input of the control circuit, which feedback signal is generated in dependence on the power supplied at the output terminals;
   means for generating a demagnetizing signal coupled to the control circuit for indicating whether the transformer is demagnetized;
   the control circuit having, during operation, (i) a first mode wherein the control signal has a predetermined fixed frequency and the duration of the pulses of the control signal is determined by the feedback signal, and (ii) a second mode wherein the frequency of the pulses of the control signal is variable and dependent on the feedback signal and wherein the control signal is delayed in dependence on the demagnetizing signal, the control circuit further including means for selecting one of the modes depending on the power supplied at the output terminals indicated by the feedback signal.

2. A switched-mode power supply circuit as claimed in claim 1, wherein the means for selecting selects the first mode if the feedback signal is smaller than a predetermined value.

3. A switched-mode power supply circuit as claimed in claim 1, wherein the means for selecting selects the second mode if the feedback signal is larger than a predetermined value.

4. A switched-mode power supply circuit, comprising:
   input terminals for receiving an input voltage;
   output terminals for supplying power to a load;
   a series arrangement of a primary winding of a transformer and a switch, coupled in parallel to the input terminals;
   a secondary winding of the transformer coupled to the output terminals;
   a control circuit having an input, and an output for supplying a control signal to the switch;
   means for generating a feedback signal coupled to the input of the control circuit and dependent upon the power supplied at the output terminals;
   a further winding of the transformer, coupled to the control circuit, for generating a demagnetizing signal indicating when the transformer is demagnetized;
   the control circuit having, during operation (i) a first mode wherein the control signal has a predetermined fixed frequency and the duration of the pulses of the control signal is determined by the feedback signal, and (ii) a second mode wherein the frequency of the pulses of the control signal is variable and dependent on the feedback signal and wherein the control signal is delayed if the transformer is not fully demagnetized, and wherein the control circuit includes means for selecting one of the modes depending on the power supplied at the output terminals indicated by the feedback signal.

5. A switched-mode power supply circuit, comprising:
   input terminals for receiving an input voltage;
   output terminals for supplying power to a load;
   a series arrangement of a primary winding of a transformer and a switch, coupled in parallel to the input terminals;
   a secondary winding of the transformer coupled to the output terminals;
   a further winding of the transformer, coupled to as control circuit, for generating a demagnetizing signal indicating when the transformer is demagnetized;
   the control circuit having (i) an input, (ii) an oscillator for generating a control signal, (iii) an output coupled to the oscillator for supplying the control signal to the switch), (iv) a demagnetization detection circuit coupled to the further winding for detecting when the transformer is demagnetized, and (v) load detection circuitry for detecting the power supplied to a load at the output terminals;
   means for generating a feedback signal coupled to both the load and the load detection circuitry which feedback signal is dependent on the power supplied to the load;
   the control circuit having, during operation (i) a first mode wherein the control signal has a predetermined fixed frequency and the duration of the pulses of the control signal is determined by the feedback signal, and (ii) a second mode wherein the frequency of the pulses of the control signal is variable and dependent on the feedback signal and wherein the control signal is delayed if the transformer is not fully demagnetized, the control circuit further including means for selecting one of the modes depending on the power supplied at the output terminals indicated by the feedback signal.

6. A switched mode power supply as claimed in claim 5, further including
   a series arrangement of a diode and the secondary winding of the transformer coupled in parallel to the output terminals, and
   a capacitor coupled in parallel to the series arrangement of the diode and the secondary winding and in parallel to the output terminals.

7. A switched mode power supply circuit as claimed in claim 5, wherein the oscillator includes means for generating an oscillator signal having a rising and falling edge and wherein the demagnetization detection circuit includes
   a clamping circuit coupled to receive and clamp the demagnetizing signal;
   a comparator for generating an output, having a non-inverting input for receiving the output of the clamping circuit, and an inverting input for receiving a reference voltage;
   a flipflop for generating an output, having a reset input coupled to the output of the comparator and a set input coupled to receive the oscillator signal; and
   an AND circuit coupled to receive the output of the flipflop and the output of the comparator, and having an output coupled to the oscillator circuit.

8. A switched mode power supply circuit as claimed in claim 7, wherein the oscillator includes a capacitor;

a first switch arranged in series with the capacitor and having an open position and a closed position;

a current source arranged in series with the first switch and the capacitor for charging the capacitor when the first switch is in the closed position;

means for discharging the capacitor coupled to the capacitor;

an operational amplifier coupled to the means for discharging;

an inverter coupled to the output of the operational amplifier;

a further flipflop for supplying an inverted output and having a set input coupled to the output of the inverter and a reset input for receiving an inverted demagnetizing signal;

a NAND circuit for receiving the inverted output of the further flipflop at a first input and a second input for receiving the inverted demagnetizing signal;

a further AND circuit for receiving the output of the NAND circuit and for receiving the output of the inverter, an output of the further AND circuit being coupled to the first switch and coupled to generate the control signal.

9. A control circuit for use in a switched-mode power supply circuit having input terminals for receiving an input voltage, output terminals for supplying power to a load, a series arrangement of a primary winding of a transformer and a switch, which series arrangement is coupled in parallel to the input terminals, means for generating a feedback signal which is dependent on the power to be supplied at the output terminals, means for generating a demagnetizing signal for indicating whether the transformers demagnetized, the control circuit comprising:

an input coupled to detect the power supplied to the load;

an output for supplying a control signal to the switch;

during operation, the control circuit having (i) a first mode wherein the control signal has a predetermined fixed frequency and the duration of the pulses of the control signal is determined by the feedback signal, and (ii) a second mode wherein the frequency of the control signal is variable and dependent on the feedback signal and wherein the control signal is delayed in dependence on the demagnetizing signal; and means for selecting one of the modes depending on the power supplied at the output terminals indicated by the feedback signal.

* * * * *